United States Patent [19]
Onishi et al.

[11] Patent Number: 6,053,208
[45] Date of Patent: Apr. 25, 2000

[54] SURGE ABSORBER ASSEMBLY

[75] Inventors: Yoshihiko Onishi; Shoichiro Nishitani; Kazuhiro Arisue; Hiromu Tomita, all of Tokyo, Japan

[73] Assignee: Mitsubishi Denki Kabushiki Kaisha, Tokyo, Japan

[21] Appl. No.: 09/325,420

[22] Filed: Jun. 4, 1999

[30] Foreign Application Priority Data

Dec. 28, 1998 [JP] Japan .................................. 10-373410

[51] Int. Cl.[7] .................................................. F16L 55/04
[52] U.S. Cl. ............................................... 138/30; 138/31
[58] Field of Search ....................................... 138/30, 31

[56] References Cited

U.S. PATENT DOCUMENTS

| 3,963,052 | 6/1976 | Mercier | 138/30 |
|---|---|---|---|
| 4,649,884 | 3/1987 | Tuckey | 138/26 |
| 4,838,887 | 6/1989 | Idriss | 604/891.1 |
| 5,054,373 | 10/1991 | Brault et al. | 138/30 |

FOREIGN PATENT DOCUMENTS 2-225801  9/1990  Japan .

*Primary Examiner*—James F. Hook
*Attorney, Agent, or Firm*—Sughrue, Mion, Zinn Macpeak & Seas, PLLC

[57] ABSTRACT

A surge absorber assembly comprises a metal case provided with a recess, a metal diaphragm attached to the perimeter of the case to form a back pressure chamber in the recess being charged with high-pressure gas, and a metal plate attached so as to hold the diaphragm against the perimeter of the case to form a damper chamber facing the diaphragm, the case, the diaphragm, and the plate being joined by a weld formed by fusing the respective perimeters thereof, and a groove being formed in at least one of the case and the plate alongside the weld.

5 Claims, 6 Drawing Sheets

SURGE ABSORBER ASSEMBLY

BACKGROUND OF THE INVENTION

1. Field of the Invention

The present invention relates to a surge absorber assembly incorporated a high-pressure fuel pump assembly mainly for use in a cylinder-injected engine, etc.

2. Description of the Related Art

Engines in which fuel is injected into the engine cylinder, the so-called "cylinder-injected" or "direct injection engines", are known among both diesel engines and gasoline engines. Cylinder-injected engines of this kind demand that sufficiently high fuel injection pressure be provided and also demand that fuel pressure surges be minimized to ensure stable injection. To these ends, compact single-cylinder high-pressure fuel pumps have been proposed which have a simple construction and are inexpensive to manufacture.

FIG. 5 is a block diagram showing the layout of a high-pressure fuel pump assembly 100 to which the present invention can be applied. In FIG. 5, a delivery pipe 1a supplies fuel to fuel injection valves 1, which inject fuel into each of the engine cylinders (not shown). This fuel is supplied to the high-pressure fuel pump assembly 100 through a low-pressure fuel supply passage 5 from a fuel tank (not shown) by means of a low-pressure fuel pump (not shown). The main component parts of the high-pressure fuel pump assembly 100 include: a low-pressure damper 13; a high-pressure fuel pump 20; a high-pressure damper 60; and a check valve 70.

The high-pressure fuel pump 20 comprises: a reed valve assembly 30 having an intake valve 22 disposed in a fuel inlet 5a and a discharge valve 21 disposed in a fuel outlet 4a; and a high-pressure fuel pump main body portion 23. The check valve 70 opens when the pressure of the fuel on the fuel supply port 9 side, which connects to the delivery pipe 1a of the high-pressure fuel pump assembly 100, is lower than the pressure of the fuel on the high-pressure damper 60 side.

Fuel pressure surges in the fuel which is supplied to the high-pressure fuel pump assembly 100 through the low-pressure fuel supply passage 5 are absorbed by the low-pressure damper 13, the fuel is pressurized by the high-pressure fuel pump assembly 100, surges in the pressurized fuel are absorbed by the high-pressure damper 60, and the fuel passes through the check valve 70 and is supplied to the delivery pipe 1a from the fuel supply port 9. A passage 10 connecting to a high-pressure regulator (not shown) is disposed between the fuel supply port 9 and the delivery pipe 1a.

A cross-section of the construction of the high-pressure fuel pump assembly 100 is shown in FIG. 6. An enlarged cross-section of the region surrounded by the dot-and-dash line in FIG. 6 is shown in FIG. 7.

In FIG. 6, a cylindrical recessed portion 40a is formed in the casing 40 of the high-pressure fuel pump assembly 100. A high pressure fuel pump 20, which comprises a reed valve assembly 30 and a high-pressure fuel pump main body portion 23, is disposed in the recessed portion 40a.

The high-pressure fuel pump 20 is constructed by arranging the reed valve assembly 30 and the high-pressure fuel pump main body portion 23 one on top of the other from the bottom portion 40b of the casing 40.

Details of the reed valve assembly 30 in the high-pressure fuel pump 20 are shown in FIG. 7.

The reed valve assembly 30 comprises two plates 31, 33 and a thin valve plate 32 sandwiched between the two plates 31, 33. The plate 31 side of the reed valve assembly 30 is disposed in contact with the bottom portion 40b, and two adjoining passages are formed in each of the two plates 31, 33 to allow fuel to pass through. Two of the passages in the plates 31, 33 have larger cross-sections than their adjoining counterpart passages so that the valves in the valve plate 32, namely the intake valve body 32a and the discharge valve body 32b, each operate in one direction only as shown by the broken lines in the-figure. The adjoining counterpart passages respectively form a fuel inlet 5a, which stops the backward motion of the intake valve body 32a and supplies fuel to the high-pressure fuel pump 20, and a fuel outlet 4a, which stops the backward motion of the discharge valve 32b and supplies fuel to the fuel discharge passage 4 from the high-pressure fuel pump main body portion 23.

The high-pressure fuel pump main body portion 23 is disposed in contact with the reed valve assembly 30.

A sleeve 41 and a fuel pressurizing chamber 45, which is surrounded by a piston 43 slidably inserted into the sleeve 41, are formed in the high-pressure fuel pump main body portion 23.

Cylindrical recesses are formed in both ends of the piston 43. A coil-shaped spring 36, which pushes the piston 43 downwards in the direction which expands the fuel pressurizing chamber 45, is disposed in a compressed condition between a spring holder 37 and the piston 43 in the recess in the reed valve assembly 30 end of the piston 43 to draw fuel in. A tappet 46 is secured in the recess in the other end of the piston 43 so as to be able to rotate freely. The tappet 46 is in contact with a cam 48, which drives the high-pressure fuel pump. The cam 48 is part of a camshaft of an engine (not shown), or is disposed on the same axis thereto, and the camshaft moves together with a crankshaft of the engine to complete one revolution for every two revolutions of the crankshaft, the piston 43 reciprocating according to the profile of the cam 48. The volume of the fuel pressurizing chamber 45 is changed by the reciprocation of the piston 43, and pressurized fuel is discharged to the fuel discharge passage 4.

A drainage chamber 52, which holds fuel which leaks out from the fuel pressurizing chamber 45 through the sliding portion 51 between the sleeve 41 and the piston 43, is formed between the sleeve 41 and a housing 42. The fuel which leaks out into the drainage chamber 52 is returned to the fuel tank (not shown) by means of a drainage passage 8 and a check valve 11, which is shown in FIG. 12. A metal bellows 53, which follows the reciprocation of the piston 43 and seals in the fuel which leaks out into the drainage chamber 52, is secured by welding to the end of the housing 42. The other end of the bellows 53 is welded to a cap 54, which is airtightly secured to the piston.

The reed valve assembly 30 and sleeve 41 are fastened to the cylindrical recessed portion 40a of the casing 40 by a threaded bush 35 by means of the housing 42. A seal is formed between the casing 40 and the housing 42 by means of an O-ring 55 to prevent fuel from leaking outside. A bracket 57 is disposed on the outside of the housing 42 and is sealed by an O-ring 56.

A recessed portion 40c is formed in the housing 40. A high-pressure damper 60 is fastened into this recessed portion 40c. High-pressure gas is enclosed in a space in the high-pressure damper 60, which is sealed by a thick substantially-cylindrical case 61 and a thin disk-shaped metal diaphragm 62. The metal diaphragm 62 moves to equalize the pressure of the high-pressure gas and the pressure of the fuel which flows from the fuel discharge passage 4 into a damper chamber 64, which is surrounded by the metal diaphragm 62 and a plate 63. The volume of the damper chamber 64 is thereby changed, absorbing pressure surges in the fuel in the fuel discharge passage 4.

A check valve 70, which opens when the pressure in the fuel on the delivery pipe 1a side is lower than the pressure of the fuel on the high-pressure fuel pump assembly side, is disposed in the fuel discharge passage 4 between the high-pressure damper 60 and the fuel supply port 9. The check valve 70 is provided to maintain the fuel within the delivery pipe 1a at high pressure even when the engine is stopped and to improve the starting of the engine.

The check valve 70 comprises: a plate 71; a housing 72; a spring 73; an O-ring 74; a spherical valve body 75; and a valve seat 76. The valve seat 76 has a tapered portion in the end of a cylindrical opening, which is a fuel passage, and the ralve body 75, which is pressed by a coil spring 73, seals this tapered portion, closing the fuel discharge passage 4. The spring 73 is positioned by means of the lousing 72 by engaging and fastening the thread on plate 71 in the thread in the casing 40, and imparts a fixed spring load to the valve body 75. The O-ring 74 is disposed between the casing 40 and housing 72 to prevent fuel from leaking outside.

In a high-pressure damper 60 for a high-pressure fuel pump assembly 100 of the above construction, a thin disk-shaped metal diaphragm 62 is held between a generally thick disk-shaped case 61 and a plate 63, the perimeter of the case 61 and the plate 63 being fused together by an arc-welding method to form a damper chamber 64 and a back pressure chamber 67.

In the course of welding, the fused weld 150 may contract in the direction of the arrows A, B, and C shown in FIG. 8, deforming the case 61 and the plate 63 such that they both expand as shown in FIG. 9, for example. As a result, one problem is that when the high-pressure damper 60 is mounted in the recess 40c by engaging a rotating jig (not shown) into receiving slots 66 and rotating a thread 65 while pressing and securing the high-pressure damper 60, the contacting portion of the plate 63 tends to form a line contact with the recess 40c, and consequently the high-pressure damper 60 is not uniformly pressed into and secured against the recess 40c. An additional problem is that when the plate is forced into surface contact with the recess 40c by the force of screwing in the thread 65, there is a risk that cracks will form in the weld 150 due to the load applied to the weld 150, and there is also a risk that the recess 40c will be deformed due to increased surface pressure over the surface where the contacting portion contacts the recess 40c.

Other problems are that the shape of the plate 63 which controls displacement of the diaphragm 62 may be deformed by heat in the course of welding, displacing the diaphragm beyond design limits, and that the diaphragm 62 may be warped by thermal contraction of the weld 150, reducing the durability of the diaphragm 62.

Yet another problem is that stresses arising between the case 61 and the weld 150, and between the plate 63 and the weld 150, respectively, due to thermal contraction during the welding of the weld 150 may lead to the risk of cracks forming in the weld 150.

SUMMARY OF THE INVENTION

The present invention aims to solve the above problems and an object of the present invention is to provide a surge absorber assembly enabling the surface pressure over the surface where the casing recess is contacted to be stabilized, also enabling the formation of cracks in the weld to be prevented, and further enabling the durability of the diaphragm to be improved.

To this end, according to the present invention, there is provided a surge absorber assembly comprising: a metal case provided with a recess; a metal diaphragm attached to the perimeter of the case to form a back pressure chamber in the recess being charged with high-pressure gas; and a metal plate attached so as to hold said diaphragm against the perimeter of the case to form a damper chamber facing the diaphragm, the case, the diaphragm, and the plate being joined by a weld formed by fusing the respective perimeters thereof, and a groove being formed in at least one of the case and the plate alongside the weld.

DETAILED DESCRIPTION OF THE PREFERRED EMBODIMENTS

Embodiment 1

Figure 1:
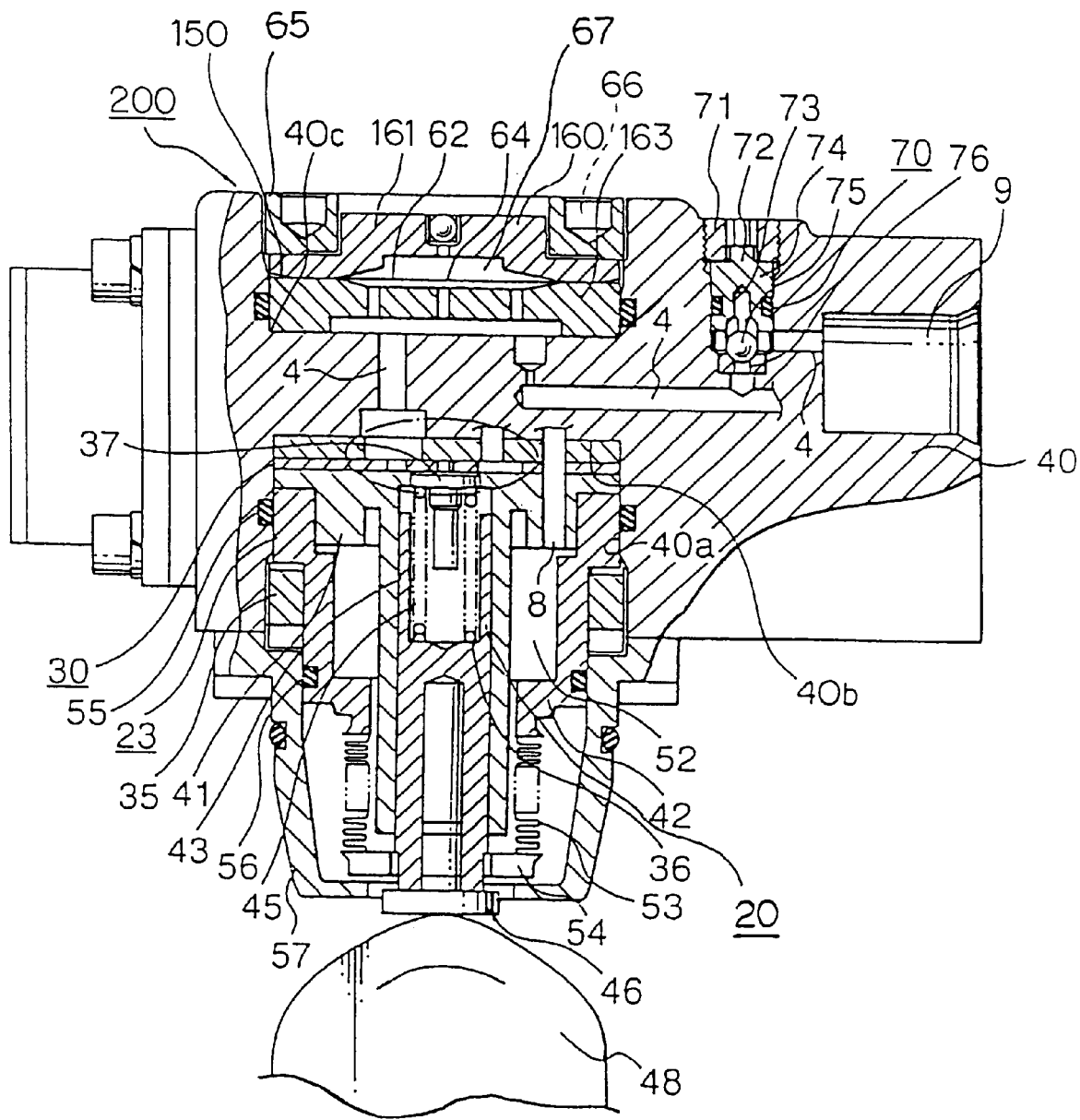
FIG. 1 is a cross-section of a high-pressure fuel pump assembly fitted with a high-pressure damper according to Embodiment 1 of the present invention.
Figure 2:
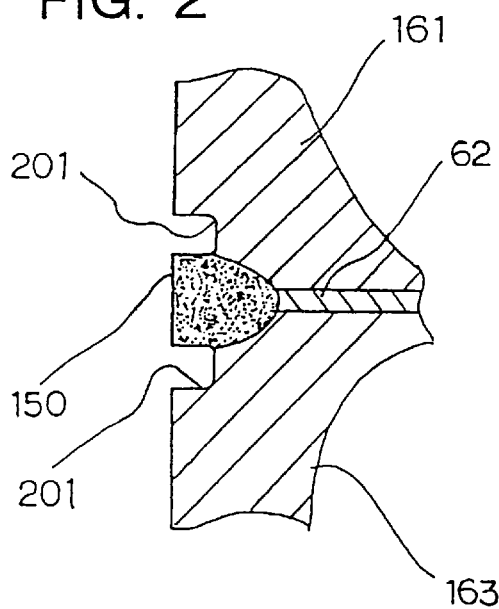
FIG. 2 is an enlargement of part of FIG. 1.

FIG. 1 is a cross-section showing the construction of a high-pressure fuel pump assembly 200 fitted with a surge absorber assembly according to an embodiment of the present invention, and FIG. 2 is an enlargement of part of FIG. 1. In the figures, parts and portions the same as or equivalent to those in the conventional example given in FIGS. 5 to 9 will be given the same numerals and duplicate explanations will be omitted.

In FIG. 1, a recess 40c is formed in the casing 40 of a high-pressure fuel pump assembly 200. A high-pressure damper 160 which is a surge absorber assembly is pressed into and secured against the recess 40c by a ring-shaped thread 65.

The high-pressure damper 160 comprises: a stainless-steel case 161 provided with a recess; a stainless-steel diaphragm 62 attached to the perimeter of the case 161 to form a back pressure chamber 67 in the recess which is charged with high-pressure gas; and a stainless-steel plate 163 attached so as to hold the diaphragm 62 against the perimeter of the case 161 to form a damper chamber 64 facing the diaphragm 62, the case 161, the diaphragm 62, and the plate 163 being joined by a weld 150 formed by fusing their respective perimeters by means of an electric arc. Grooves 201 are formed in the case 161 and the plate 163, respectively, alongside the weld 150.

In a high-pressure fuel pump assembly 200 of the above construction, the volume of a fuel pressurizing chamber 45 is changed by the reciprocation of a piston 43 accompanying the rotation of a crankshaft, and fuel pressurized to a high pressure is discharged into a fuel discharge passage 4. This fuel then flows into the damper chamber 64 of the high-pressure damper 160 which is a surge absorber assembly and the diaphragm 62 moves so that the pressure of the fuel equalizes with the pressure of the high-pressure gas in the back pressure chamber 67. The volume of the damper chamber 64 is thereby changed, absorbing pressure surges in the fuel in the fuel discharge passage 4.

In a high-pressure damper 160 of the above construction, the weld 150 fused by arc-welding undergoes thermal contraction, but the force of this thermal contraction acting on the case 161 and the plate 163 is reduced because the grooves 201 are formed alongside the weld 150, enabling the amount of deformation of the case 161 and the plate 163 due to the force of this thermal contraction to be reduced. For that reason, when the high-pressure damper 160 is mounted in the recess 40c by engaging a rotating jig (not shown) into receiving slots 66 and rotating a thread 65 while pressing and securing the high-pressure damper 160, the contacting portion of the plate 63 easily forms a surface contact with the recess 40c, and consequently the high-pressure damper 160 is uniformly pressed against the recess 40c.

Furthermore, because the grooves 201 are formed alongside the weld 150, the amount of heat transmitted from the weld 150 to the case 161 and the plate 163 during welding is reduced, reducing the amount of heat deformation of the plate 163 which controls displacement of the diaphragm 62, thereby preventing displacement of the diaphragm beyond design limits, and improving the durability of the diaphragm 62. Still furthermore, stresses arising between the case 161 and the weld 150, and between the plate 163 and the weld 150, respectively, due to thermal contraction of the weld 150 are reduced, preventing the formation of cracks in the weld 150.

Embodiment 2

Figure 3:
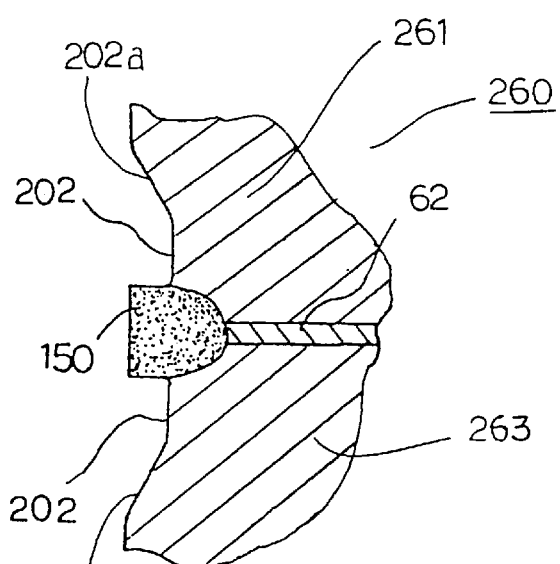
FIG. 3 is a partial cross-section of a high-pressure damper according to Embodiment 2 of the present invention.

FIG. 3 is an enlarged cross-section of part of a high-pressure damper 260 according to Embodiment 2 of the present invention. This example differs from that of Embodiment 1 in that grooves 202 formed in the perimeter of a case 261 and a plate 263 are shaped so as to wide radially outwards and are provided with tapers 202a.

In this embodiment, the grooves 202 are provided with tapers 202a, improving the workability of the grooves 202.

Embodiment 3

Figure 4:
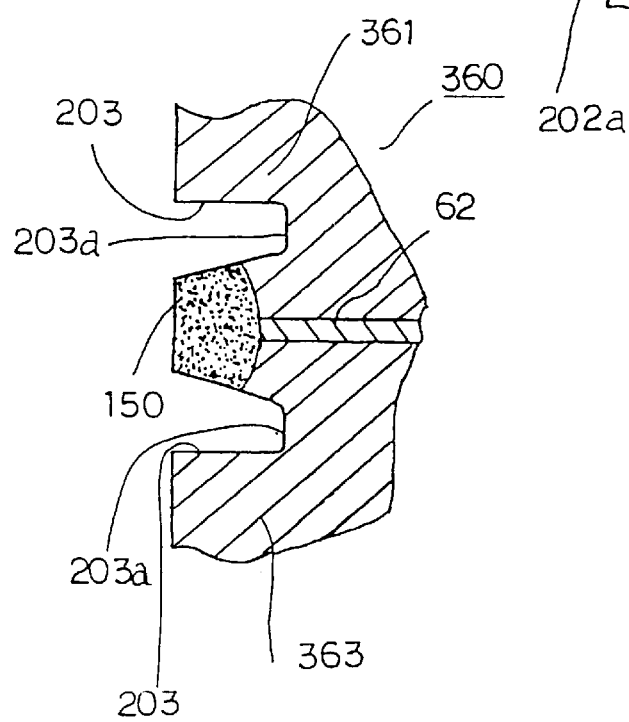
FIG. 4 is a partial cross-section of a high-pressure damper according to Embodiment 3 of the present invention.
Figure 5:
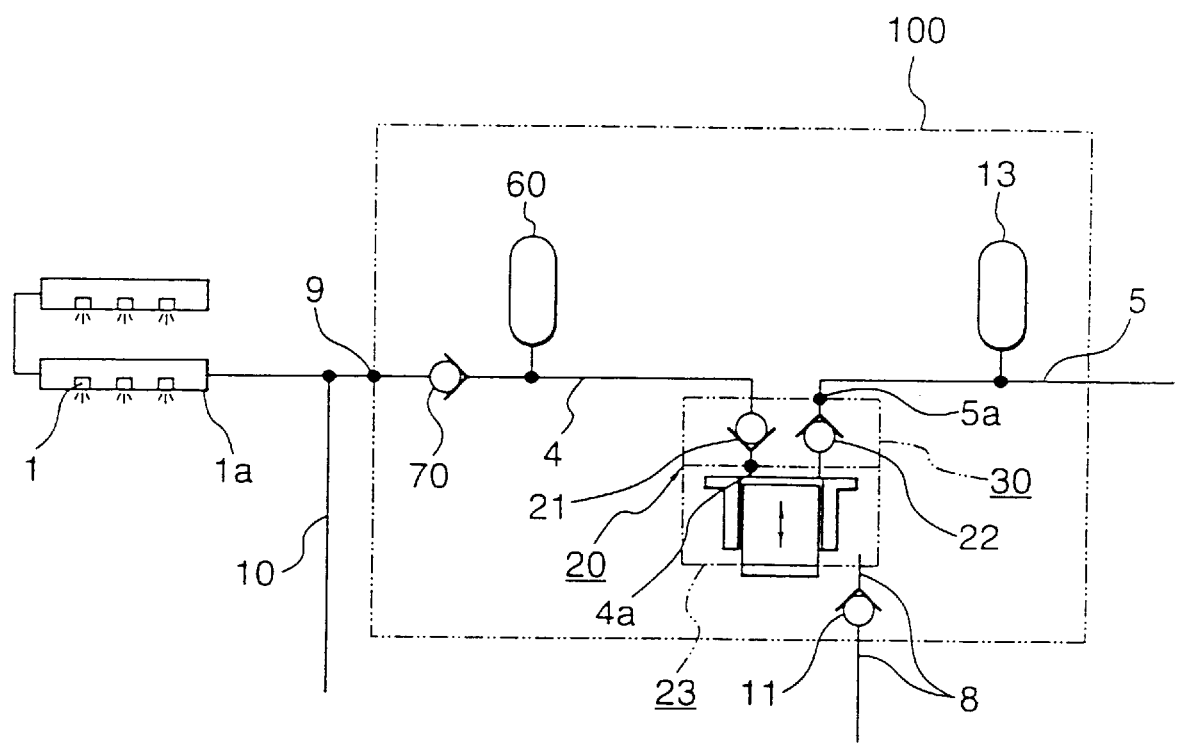
FIG. 5 is a block diagram showing the construction of a conventional high-pressure fuel pump assembly.
Figure 6:
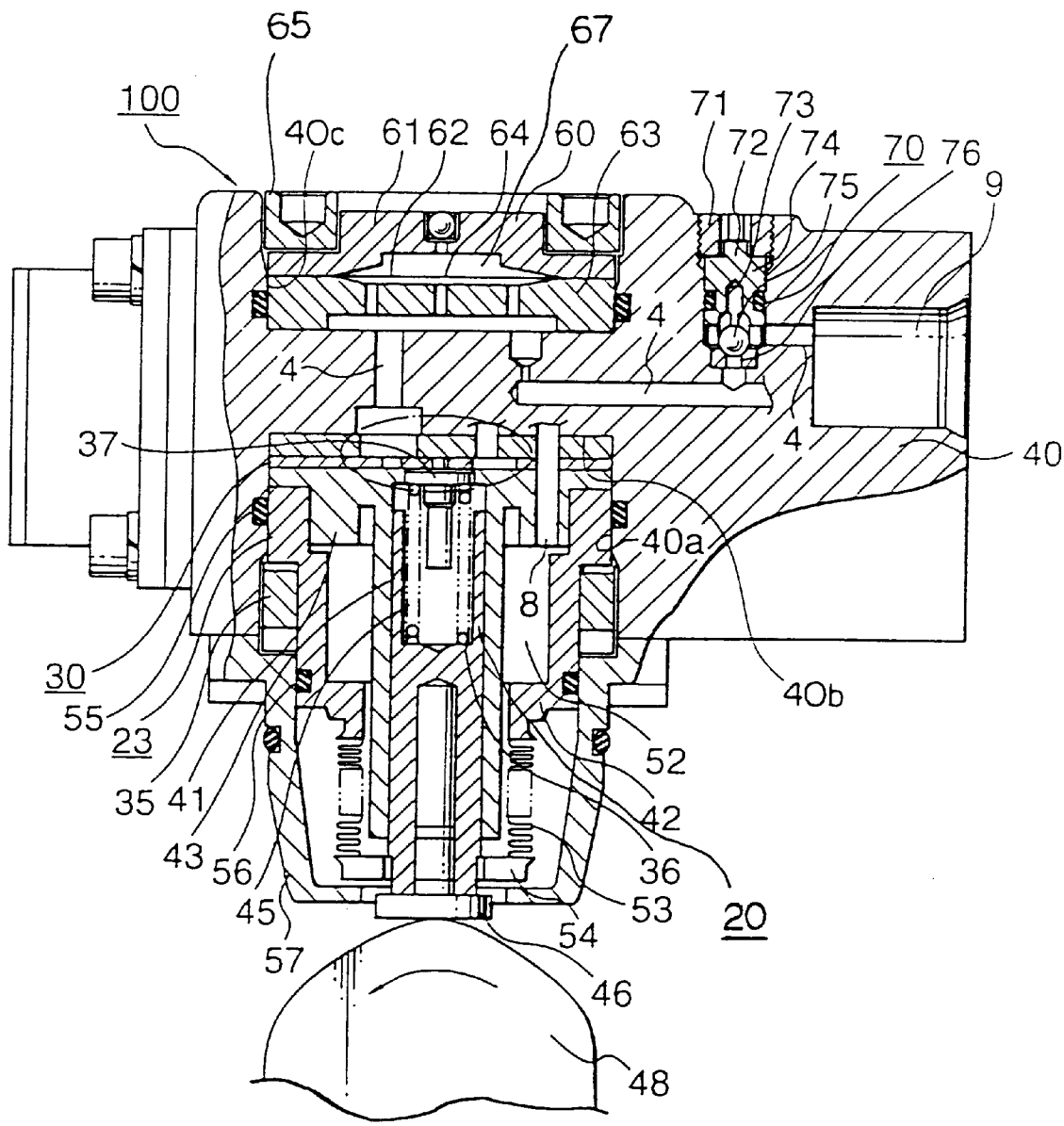
FIG. 6 is a cross-section showing the construction of a conventional high-pressure fuel pump assembly.
Figure 7:
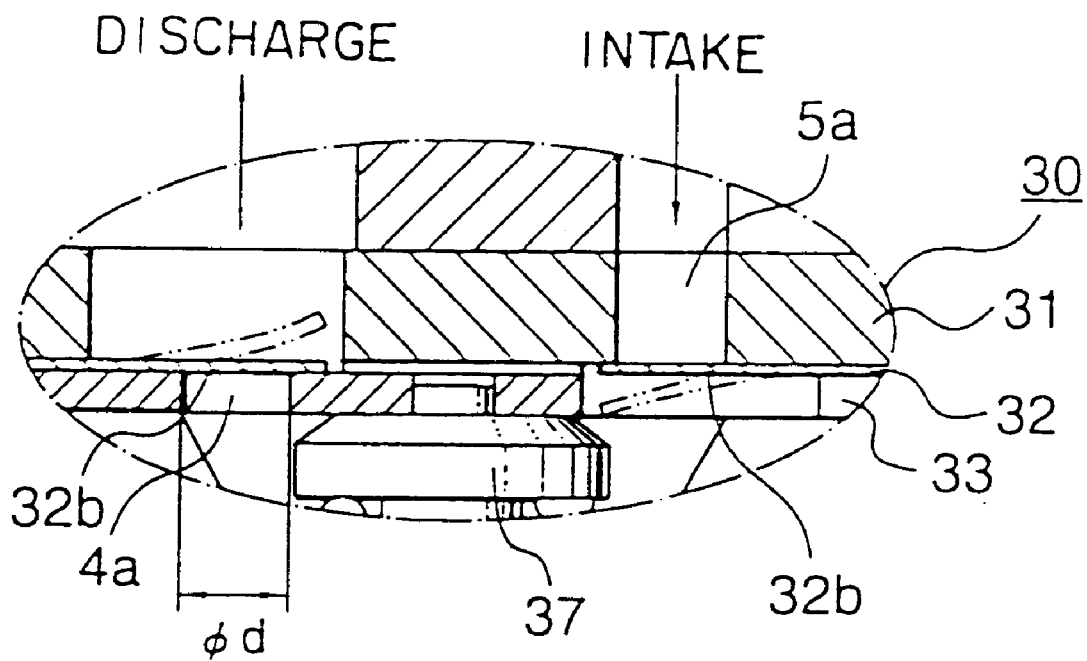
FIG. 7 is a cross-section showing the construction of reed valves used in a conventional high-pressure fuel pump assembly.
Figure 8:
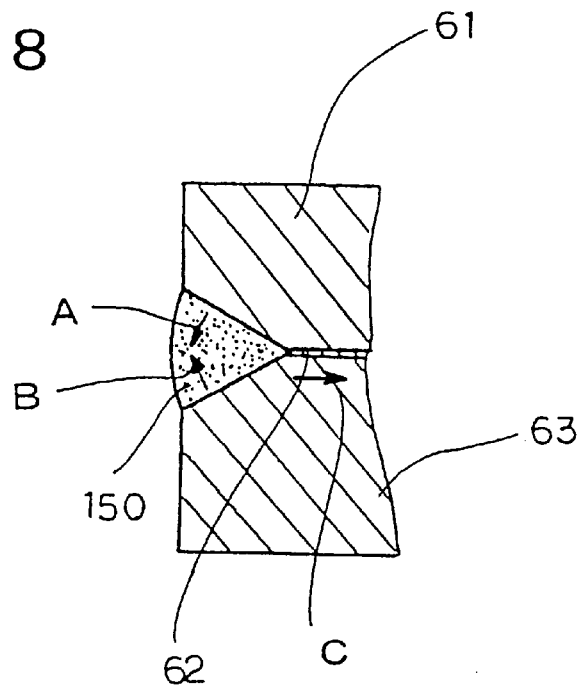
FIG. 8 is an enlargement of the weld in FIG. 6.
Figure 9:
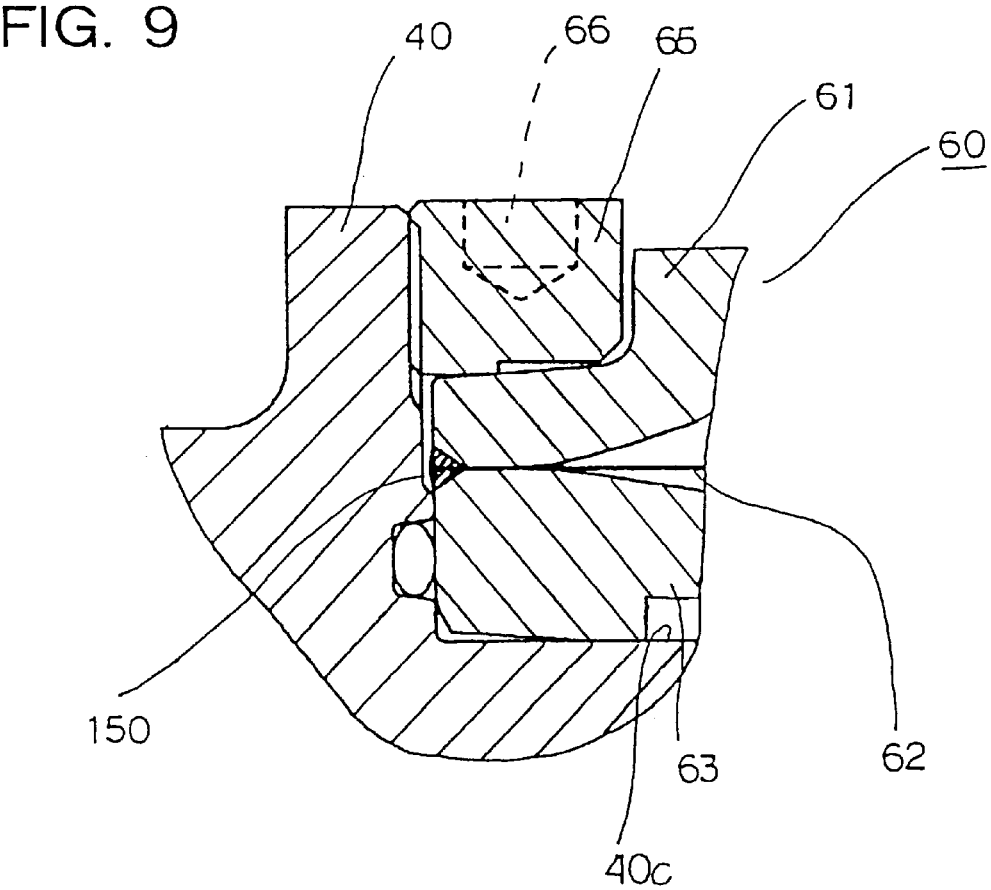
FIG. 9 is a partial enlargement of FIG. 6.

FIG. 4 is an enlarged cross-section of part of a high-pressure damper 360 according to Embodiment 3 of the present invention. In this example, since the bottoms 203a of grooves 203 are positioned further inwards than the weld 150, the portions fused during arc-welding are further outwards than the bottoms 203a, enabling the positioning of the fused portions and the shape of the weld 150 to be stabilized, thereby enabling irregularities in the position of the weld 150 formed by fusing the perimeters of the case 361, the diaphragm 62, and the plate 361, respectively, and irregularities in the shape of the fused portions to be reduced accordingly, in turn enabling the provision of stable bonds among the case 361, the diaphragm 62, and the plate 363.

Moreover, in each of the above embodiments, explanations have been given for cases where arc-welding is performed, but if welding is performed by laser beam or electron beam, the directivity of the beam is superior, and the weld is formed more reliably in the desired position.

Furthermore, a single groove may also be formed on one side of the weld only. In addition, the surge absorber assembly can naturally be applied to devices other than high-pressure fuel pump assemblies.

As described above, the surge absorber assembly according to one aspect of the present invention comprising the groove being formed in at least one of the case and the plate alongside the weld. Therefore, the force of the thermal contraction acting on the case and the plate is reduced in the course of welding, enabling the amount of deformation of the case and the plate. Thus, for example, when a surge absorber assembly is mounted in the recess, the surge absorber assembly easily contact with the recess, and is uniformly pressed against the recess. Furthermore, the amount of heat transmitted from the weld to the case and the plate during welding is reduced, reducing the amount of heat deformation of the plate which controls displacement of the diaphragm, thereby preventing displacement of the diaphragm beyond design limits, and improving the durability of the diaphragm. Still furthermore, stress arising between the case and the weld, and between the plate and the weld, respectively, due to thermal contraction of the weld are reduced, preventing the formation of cracks in the weld.

According to one form of the surge absorber assembly, the cross-section of the groove may be shaped so as to wide radially outwards. Therefore, the workability of the groove improves.

According to another form of the surge absorber assembly, the bottom of the groove may be positioned further inwards than the weld. Therefore, the portions fused during arc-welding are further outwards than the bottoms, enabling the positioning of the fused portions and the shape of the weld to be stabilized, thereby enabling irregularities in the position of the weld formed by fusing the perimeters of the case, the diaphragm, and the plate, respectively, and irregularities in the shape of the fused portions to be reduced accordingly, in turn enabling the provision of stable bonds among the case, the diaphragm, and the plate.

According to still another form of the surge absorber assembly, the surge absorber assembly may be disposed in a fuel discharge passage through which fuel discharged from a high-pressure fuel pump passes, the diaphragm moving so that the pressure of the fuel flowing into the damper chamber from the fuel discharge passage equalizes with the pressure of the high-pressure gas, changing the volume of the damper chamber. Therefore, the surge absorber assembly assuredly absorbs fuel pressure surges in the fuel in the fuel discharge passage.

According to another form of the surge absorber assembly, the diaphragm may be composed of stainless steel. Therefore, the diaphragm is superior to high temperature strength and corrosion resistance in high temperature, the surge absorber assembly assuredly absorbs fuel pressure surges under high temperature during long time.

What is claimed is:

1. A surge absorber assembly comprising:
    a metal case provided with a recess;
    a metal diaphragm attached to the perimeter of said case to form a back pressure chamber in said recess being charged with high-pressure gas; and
    a metal plate attached so as to hold said diaphragm against the perimeter of said case to form a damper chamber facing said diaphragm,
    said case, said diaphragm, and said plate being joined by a weld formed by fusing the respective perimeters thereof, and a groove being formed in at least one of said case and said plate alongside said weld.

2. The surge absorber assembly according to claim 1 wherein the cross-section of said groove is shaped so as to widen radially outwards.

3. The surge absorber assembly according to claim 1 wherein the bottom of said groove is further inwards than said weld.

4. The surge absorber assembly according to claim 1 wherein said surge absorber assembly is disposed in a fuel discharge passage through which fuel discharged from a high-pressure fuel pump passes, said diaphragm moving so that the pressure of the fuel flowing into said damper chamber from said fuel discharge passage equalizes with the pressure of said high-pressure gas, changing the volume of said damper chamber and absorbing fuel pressure surges in said fuel in said fuel discharge passage.

5. The surge absorber assembly according to claim 1 wherein said diaphragm is composed of stainless steel.

* * * * *